United States Patent
Shila et al.

(10) Patent No.: US 10,116,635 B1
(45) Date of Patent: Oct. 30, 2018

(54) MOBILE-BASED EQUIPMENT SERVICE SYSTEM USING ENCRYPTED CODE OFFLOADING

(71) Applicant: OTIS ELEVATOR COMPANY, Farmington, CT (US)

(72) Inventors: Devu Manikantan Shila, West Hartford, CT (US); Arthur T. Grondine, Deep River, CT (US); Michael Garfinkel, West Hartford, CT (US); Teems E. Lovett, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/499,356

(22) Filed: Apr. 27, 2017

(51) Int. Cl.
| | |
|---|---|
| *H04L 29/06* | (2006.01) |
| *H04W 12/06* | (2009.01) |
| *B66B 1/34* | (2006.01) |
| *H04L 29/08* | (2006.01) |
| *H04W 88/02* | (2009.01) |

(52) U.S. Cl.
CPC ........ *H04L 63/0485* (2013.01); *B66B 1/3461* (2013.01); *H04L 63/0442* (2013.01); *H04L 63/08* (2013.01); *H04W 12/06* (2013.01); *H04L 67/10* (2013.01); *H04W 88/02* (2013.01)

(58) Field of Classification Search
CPC .................................................. H04L 63/0485
See application file for complete search history.

(56) References Cited

U.S. PATENT DOCUMENTS

| | | | | |
|---|---|---|---|---|
| 9,108,824 | B2* | 8/2015 | Hughes | B66B 1/34 |
| 2013/0283392 | A1* | 10/2013 | Mirashrafi | G06F 21/10 |
| | | | | 726/26 |
| 2014/0123124 | A1* | 5/2014 | Gray | G06F 8/665 |
| | | | | 717/170 |
| 2015/0194000 | A1* | 7/2015 | Schoenfelder | G07C 9/00309 |
| | | | | 340/5.61 |
| 2015/0256332 | A1* | 9/2015 | Raj | H04L 67/1095 |
| | | | | 713/150 |
| 2016/0009525 | A1* | 1/2016 | DePaola | B66B 1/468 |
| | | | | 187/380 |
| 2016/0107861 | A1 | 4/2016 | Thebeau et al. | |
| 2016/0134686 | A1 | 5/2016 | Youker et al. | |
| 2016/0176678 | A1 | 6/2016 | Kusserow | |

(Continued)

FOREIGN PATENT DOCUMENTS

| | | |
|---|---|---|
| CN | 102452589 A | 5/2012 |
| CN | 202267861 U | 6/2012 |

(Continued)

*Primary Examiner* — Teshome Hailu
*Assistant Examiner* — Thanh Le
(74) *Attorney, Agent, or Firm* — Cantor Colburn LLP

(57) ABSTRACT

A mobile-based equipment service system includes a remote server, a mobile device, and at least one equipment controller. The mobile device includes a user interface, and is configured to send a user authentication message, initiated by a user via the user interface, to the remote server. The remote server is configured to verify the user via the user authentication message and once verified, send an encrypted blob to the mobile device in response to the user authentication message. At least one equipment controller is configured to receive and decrypt the encrypted blob from the mobile device.

17 Claims, 2 Drawing Sheets

(56) References Cited

U.S. PATENT DOCUMENTS

2016/0355375 A1   12/2016  Simcik et al.
2017/0010099 A1    1/2017  Simcik

FOREIGN PATENT DOCUMENTS

| CN | 103449267 A | 12/2013 |
|---|---|---|
| CN | 102862882 B | 4/2015 |
| CN | 104555627 A | 4/2015 |
| CN | 104627752 A | 5/2015 |
| CN | 105645202 A | 6/2016 |
| CN | 205709263 U | 11/2016 |
| WO | 2015119620 A1 | 8/2015 |
| WO | 2016207477 A1 | 12/2016 |

* cited by examiner

MOBILE-BASED EQUIPMENT SERVICE SYSTEM USING ENCRYPTED CODE OFFLOADING

BACKGROUND

The present disclosure relates to equipment service system, and more particularly, to mobile-based equipment service systems using encrypted code offloading.

Current service tools used for accessing equipment controllers (e.g., elevator controllers) may rely on using a separate hardware tool that may securely authenticate to the controllers while preventing reverse engineering of proprietary codes and tampering attacks. Unfortunately, such hardware based capabilities may not be cost effective. Alternatively, use of mobile devices as a service tool may be feasible, but such mobile devices are not in control of the company providing the equipment services. It may further be difficult to enforce security requirements to facilitate tamper-proof hardware and an execution environment.

BRIEF DESCRIPTION

A mobile-based equipment service system applied by a user, the mobile-based equipment service system according to one, non-limiting, embodiment of the present disclosure includes a remote server, a mobile device including a user interface, the mobile device being configured to send a user authentication message initiated by the user via the user interface to the remote server, wherein the remote server is configured to verify the user via the user authentication message and once verified, send an encrypted blob to the mobile device in response to the user authentication message, and at least one equipment controller configured to receive and decrypt the encrypted blob from the mobile device.

Additionally to the foregoing embodiment, the mobile-based equipment service system includes at least one site, wherein each site of the at least one site includes at least one respective equipment controller of the at least one equipment controller, wherein the encrypted blob is secured by the remote server via a unique private key associated with a respective site of the at least one site.

In the alternative or additionally thereto, in the foregoing embodiment, the user authentication message includes a selected site of the at least one site selected by the user.

In the alternative or additionally thereto, in the foregoing embodiment, the encrypted blob includes firmware and a header configured to be extracted by a respective equipment controller of the at least one equipment controller.

In the alternative or additionally thereto, in the foregoing embodiment, the header includes the unique private key, and a duration to authenticate.

In the alternative or additionally thereto, in the foregoing embodiment, the header includes a version that is verified by the respective equipment controller.

In the alternative or additionally thereto, in the foregoing embodiment, the at least one site is a plurality of buildings.

In the alternative or additionally thereto, in the foregoing embodiment, the at least one site is a plurality of geographic regions.

In the alternative or additionally thereto, in the foregoing embodiment, the at least one equipment controller is at least one elevator controller.

In the alternative or additionally thereto, in the foregoing embodiment, the at least one equipment controller does not have internet connectivity.

In the alternative or additionally thereto, in the foregoing embodiment, the at least one equipment controller is configured to reply to the mobile device requesting the user authentication message from the user.

In the alternative or additionally thereto, in the foregoing embodiment, the encrypted blob is asymmetric encrypted.

A method of operating a mobile-based equipment service system according to another, non-limiting, embodiment includes sending a selected site from a mobile device to a remote server, encrypting a blob by the remote server using a private key associated with the selected site and preprogrammed into the remote server, sending the encrypted blob to the mobile device, sending the encrypted blob from the mobile device to a controller associated with the selected site, and decrypting the encrypted blob by the controller utilizing the private key preprogrammed into the controller.

Additionally to the foregoing embodiment, the selected site is selected by a user of the mobile device and is sent to the remote server as part of an authentication message that includes credentials of the user.

In the alternative or additionally thereto, in the foregoing embodiment, the method includes sending a credential request from the controller to the mobile device, entering of credentials by a user into the mobile device, and sending the credentials from the mobile device to the controller.

In the alternative or additionally thereto, in the foregoing embodiment, the method includes comparing the credentials sent from the mobile device to a hash of credentials sent as part of the encrypted blob by the controller.

In the alternative or additionally thereto, in the foregoing embodiment, the remote server is cloud-based.

In the alternative or additionally thereto, in the foregoing embodiment, the mobile device is a smartphone.

In the alternative or additionally thereto, in the foregoing embodiment, the selected site is a building and the controller is an elevator controller.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
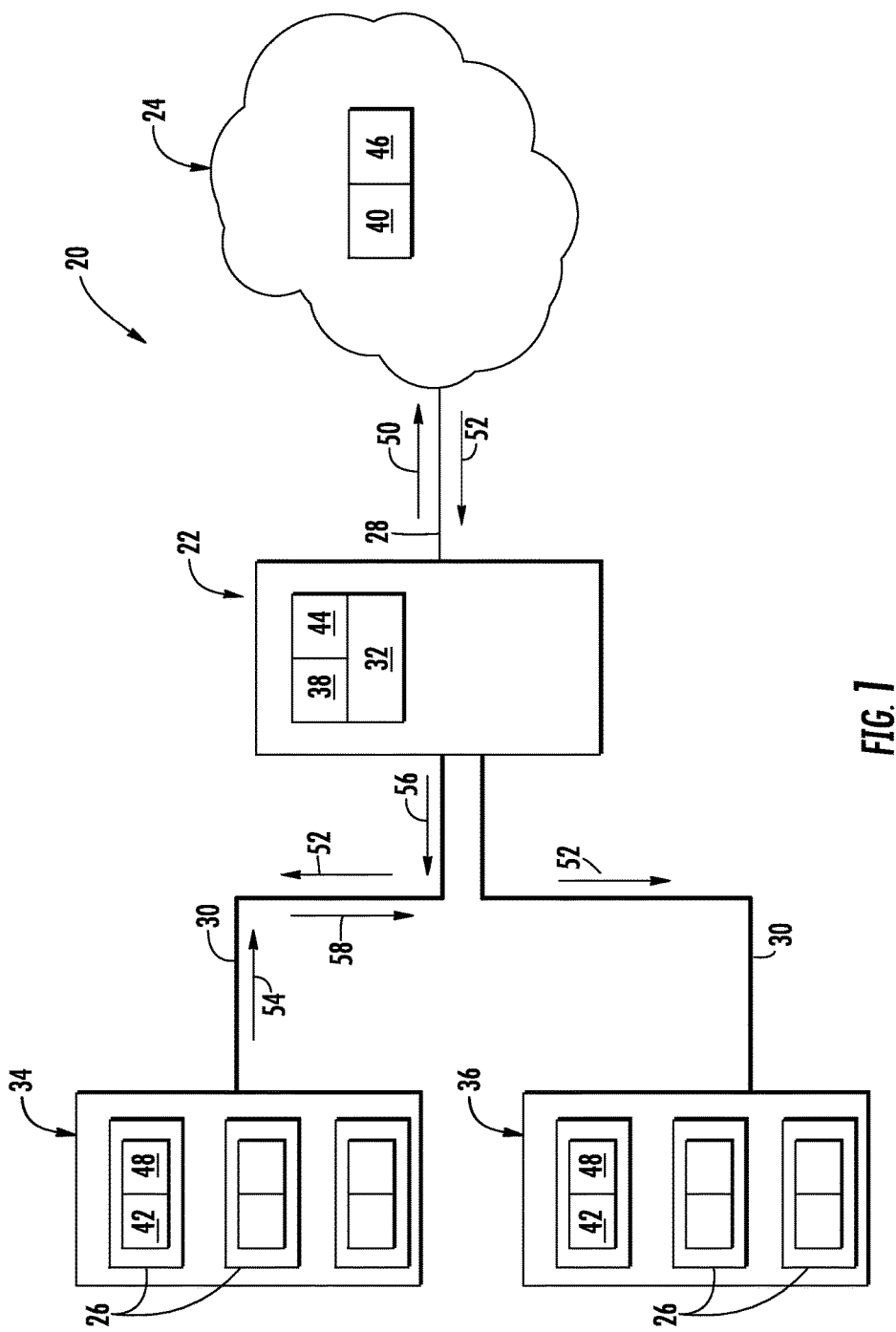
FIG. 1 is a schematic of a mobile-based equipment service system as one, non-limiting, exemplary embodiment of the present disclosure.

Referring to FIG. 1, an exemplary embodiment of an equipment service system 20, which may be mobile-based, generally employs code offloading architecture and asymmetric encryption. The equipment service system 20 may include, or may use portions of, a mobile device 22, a remote server 24, and at least one equipment controller 26. The mobile device 22 may communicate with the remote server 24 and the equipment controller 26 over respective pathways 28, 30 that may be wired or wireless. If wireless, the pathways 28, 30 may be association with such communication protocols as Bluetooth Wi-Fi, Near Field Communications (NFC), and others. The mobile device 22 may include a user interface 32 that facilitates system interaction with a user (e.g., equipment repairman). Non-limiting examples of the mobile device 22 may include a smartphone, a tablet, and others. The remote server 24 may be cloud-based (i.e., cloud 24). The equipment service system 20 generally enables the execution of code at the cloud 24 and/or the equipment controller 26. The mobile 22 may not execute code, and instead, may simply be a carrier of the code. In one embodiment, the remote server 24 and the controller 26 may be owned and controlled by a common company.

The equipment service system 20 may further include at least one site (i.e., two illustrated as 34, 36 in FIG. 1). Each site 34, 36 may include at last one equipment controller 26 (i.e., three illustrated for each site 34, 36). Non-limiting examples of sites 34, 36 may be a building, a geographic region, and others. A non-limiting example of an equipment controller 26 may be an elevator controller that may be serviced by the manufacturer of the elevator. The mobile device 22, the remote server 24, and the equipment controller 26 may each include respective processors 38, 40, 42 (e.g., microprocessors), and storage mediums 44, 46, 48 that may be computer writeable and readable.

Figure 2:
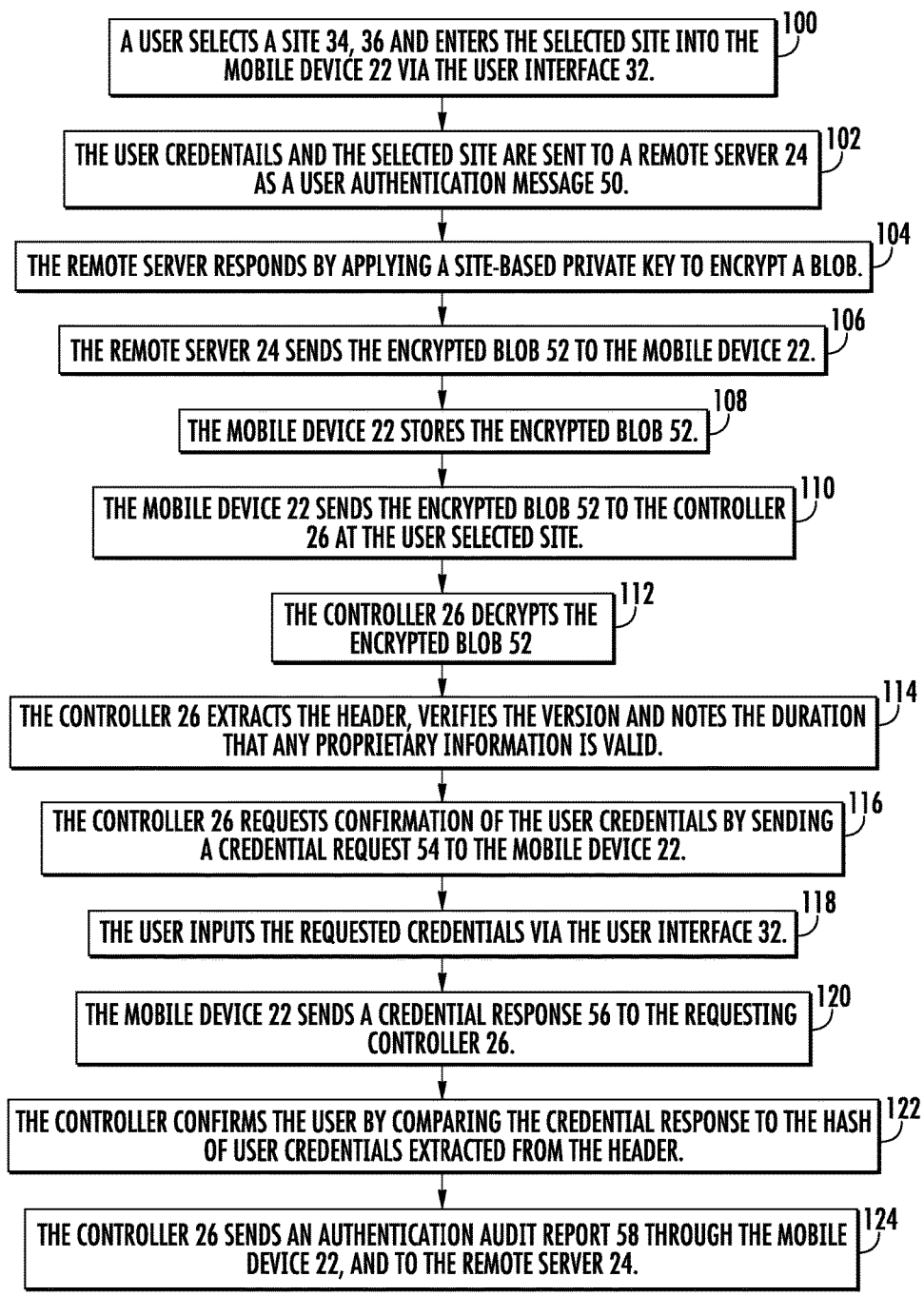
FIG. 2 is a flowchart illustrating a method of operating the mobile-based equipment service system.

Referring to FIG. 2, a method of operating the equipment service system 20 is illustrated. At block 100, a user selects a site 34, 36 and enters the selected site into the mobile device 22 via the user interface 32. In one embodiment, the user may also enter user credentials into the mobile device 22 for security reasons. Alternatively, the mobile device 22 may include an application that may recognize the user credentials internally. At block 102, the user credentials and selected site are sent to the remote server 24 as a user authentication message (see arrow 50).

At block 104, the remote server 24 encrypts a blob with a site-based private key associated with selected site provided by the user. The remote server 24 may include an application that is preprogrammed with and stores a unique private key for each respective site 34, 36. That is, site 34 is assigned a private key that is different than a private key of the site 36. The encryption of the blob 52 may be an asymmetric encryption employed to protect proprietary information contained within the blob 52. At block 106, the remote server 24 sends the encrypted blob (see arrow 52) to the mobile device 22.

The blob 52 may include a header and firmware. The header may include a version (i.e., a version of the blob), a duration, a hash of user credentials (e.g., user password), an equipment controller identification, and a region or building code that the equipment belongs to. The version may generally be an index. The duration may be an authentication duration intended to provide a validity time limit that a particular executable is valid. The hash of user credentials is intended for use by the controller 26.

At block 108, the mobile device 22 may store the encrypted blob 52. The user of the mobile device 22 may not be, or need not be, aware of the encrypted blob 52 being received and/or stored by the mobile device 22. At block 110, the mobile device 22 may send the encrypted blob 52 to the controller 26 selected by the user based on need and at the user selected site (i.e., site 34, or site 36. That is, when the user authenticates to the Cloud initially, the user may request access to a given site. The Cloud may include a database internally to check whether the requesting user has permissions to access the associated site and/or controller, and may then generate the blob for that controller. At block 112, the controller 26 that receives the encrypted blob 52 may decrypt the blob using the private key of the site receiving the blob. At block 114, the controller 26 may then extract the header, verify the version and also note the duration that any proprietary information is valid. At block 116, the controller 26 may request confirmation of the user credentials by sending a credential request (see arrow 54) to the mobile device 22. At block 118, the user may input the requested credentials (e.g., user password) via the user interface 32. At block 120, the mobile device 22 may send a credential response (see arrow 56) to the requesting controller 26. At block 122, the controller may confirm the user by comparing the credential response to the hash of user credentials extracted from the header.

At block 124, the controller 26 may send an authentication audit report (see arrow 58) through the mobile device 22, and to the remote server 24. The authentication audit report may include the site-based private key, thereby notifying the remote server 24 of the source of the audit report. At this point, the user may now have access to commands via, for example, a menu.

Advantages and benefits of the present disclosure include the secure use of a mobile device between a company cloud and a controller. Other advantages include proprietary information that is never exposed to undesired individuals, a system where an attacker cannot perform dynamic memory analysis, a code that cannot be tampered with or modified, a coding system with duration of time limits for added security, and the prevention of user spoofing with encoding user identity.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A mobile-based equipment service system applied by a user, the mobile-based equipment service system comprising:
   a remote server including a computer processor, a non-transitory storage medium, an application executed by the computer processor and stored in the non-transitory storage medium, a user authentication database stored in the non-transitory storage medium and applied by the application;
   a mobile device including a user interface, the mobile device being configured to send a user authentication message initiated by the user via the user interface to the remote server, wherein the application is configured to verify the user by comparing the user authentication message to the user authentication database, and once verified, develop and effect the sending of an encrypted blob to the mobile device in response to the user authentication message;
   at least one equipment controller including a computer processor, a non-transitory storage medium, executable code, executed by the computer processor and stored in the non-transitory storage medium;
   at least one site, wherein each site of the at least one site includes at least one respective equipment controller of the at least one equipment controller, and the encrypted blob is secured by the remote server via a site specific private key associated with a respective site of the at least one site, the authentication message including user credentials and a selected site of the at least one site selected by the user, wherein the computer processor of the equipment controller is configured to receive the encrypted blob and the executable code is configured to decrypt the encrypted blob received from the mobile device and utilizing the site specific private key.

2. The mobile-based equipment service system set forth in claim 1, wherein the encrypted blob includes firmware and a header configured to be extracted by the executable code.

3. The mobile-based equipment service system set forth in claim 2, wherein the header includes the site specific private key, and a duration to authenticate.

4. The mobile-based equipment service system set forth in claim 3, wherein the header includes a version that is verified by the executable code.

5. The mobile-based equipment service system set forth in claim 1, wherein the at least one site is a plurality of buildings.

6. The mobile-based equipment service system set forth in claim 1, wherein the at least one site is a plurality of geographic regions.

7. The mobile-based equipment service system set forth in claim 1, wherein the at least one equipment controller is at least one elevator controller.

8. The mobile-based equipment service system set forth in claim 1, wherein the at least one equipment controller does not have internet connectivity.

9. The mobile-based equipment service system set forth in claim 1, wherein the at least one equipment controller is configured to reply to the mobile device by requesting the user authentication message from the user.

10. The mobile-based equipment service system set forth in claim 1, wherein the encrypted blob is asymmetric encrypted.

11. A method of operating a mobile-based equipment service system comprising:
    sending a selected site from a mobile device to a remote server;
    encrypting a blob by an application executed by a processor of the remote server using a private key associated with the selected site and preprogrammed into the remote server as part of a database stored in a non-transitory storage medium of the remote server;
    sending the encrypted blob to the mobile device;
    sending the encrypted blob from the mobile device to a controller associated with the selected site; and
    decrypting the encrypted blob by an executable code executed by a processor of the controller utilizing the private key preprogrammed into the controller.

12. The method set forth in claim 11, wherein the selected site is selected by a user of the mobile device and is sent to the remote server as part of an authentication message that includes credentials of the user.

13. The method set forth in claim 11 further comprising:
    sending a credential request from the controller to the mobile device;
    entering of credentials by a user into the mobile device; and
    sending the credentials from the mobile device to the controller.

14. The method set forth in claim 13 further comprising:
    comparing the credentials sent from the mobile device to a hash of credentials sent as part of the encrypted blob by the controller.

15. The method set forth in claim 11, wherein the remote server is cloud-based.

16. The method set forth in claim 11, wherein the mobile device is a smartphone.

17. The method set forth in claim 11, wherein the selected site is a building and the controller is an elevator controller.

* * * * *